US009811518B2

(12) United States Patent
Leidner et al.

(10) Patent No.: US 9,811,518 B2
(45) Date of Patent: *Nov. 7, 2017

(54) SYSTEMS, METHODS, AND SOFTWARE FOR QUESTIONBASED SENTIMENT ANALYSIS AND SUMMARIZATION

(71) Applicant: Thomson Reuters Global Resources, Baar (CH)

(72) Inventors: Jochen L. Leidner, Eagan, MN (US); Kingsley Martin, Beverly Shores, IN (US); Trace Liggett, Rosemount, MN (US); Gary Berosik, South St. Paul, MN (US); Thomas Zielund, Shakopee, MN (US)

(73) Assignee: Thomson Reuters Global Resources, Baar (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/337,105

(22) Filed: Jul. 21, 2014

(65) Prior Publication Data

US 2015/0112877 A1    Apr. 23, 2015

Related U.S. Application Data

(63) Continuation of application No. 12/553,752, filed on Sep. 3, 2009, now Pat. No. 8,788,523, which is a (Continued)

(51) Int. Cl.
*G06F 17/30* (2006.01)
*G06Q 10/00* (2012.01)
(Continued)

(52) U.S. Cl.
CPC .......... *G06F 17/2775* (2013.01); *G06F 15/16* (2013.01); *G06F 17/00* (2013.01);
(Continued)

(58) Field of Classification Search
CPC ........ G06Q 30/02; G06Q 30/06; G06Q 10/10; G06Q 10/06; G06F 17/30864;
(Continued)

(56) References Cited

U.S. PATENT DOCUMENTS 5,794,236 A * 8/1998 Mehrle ............. G06F 17/30728
6,282,509 B1 * 8/2001 Miyauchi ........................ 704/10
(Continued)

FOREIGN PATENT DOCUMENTS

WO    WO03017130     * 2/2003
WO    WO 2004/06169  * 7/2004
WO    WO2005089217   * 9/2005

OTHER PUBLICATIONS

Bertin Klein et al., "Distributed knowledge-based parsing for document analysis and understanding",Research and Technology Advances in Digital Libraries, 1999. Proceedings. IEEE Forum , pp. 6-15.*

*Primary Examiner* — Srirama Channavajjala
(74) *Attorney, Agent, or Firm* — Duncan Galloway Egan Greenwald PLLC; Kevin T. Duncan (57) ABSTRACT

Exemplary systems for processing a corpus of documents, such as legal contracts or agreements, are disclosed. The systems include a phrase discovery engine which derives statistics and phrase equivalence classes, groups of phrase equivalence classes, and uberphrases (clauses) bounded by phrases. These can be used to determine origins of phrases or clauses within given legal contract or to suggest alternative phrases and clauses.

19 Claims, 9 Drawing Sheets

Related U.S. Application Data continuation of application No. 12/354,617, filed on Jan. 15, 2009, now abandoned.

(60) Provisional application No. 61/011,147, filed on Jan. 15, 2008.

(51) Int. Cl.

| | | |
|---|---|---|
| *G06F 17/27* | (2006.01) | |
| *G06Q 10/06* | (2012.01) | |
| *G06Q 10/10* | (2012.01) | |
| *G06Q 50/18* | (2012.01) | |
| *G06F 15/16* | (2006.01) | |
| *G06F 17/00* | (2006.01) | |
| *G06Q 50/00* | (2012.01) | |
| *G06F 17/24* | (2006.01) | |

(52) U.S. Cl.
CPC ........ *G06F 17/243* (2013.01); *G06F 17/2705* (2013.01); *G06F 17/30* (2013.01); *G06F 17/30011* (2013.01); *G06F 17/30194* (2013.01); *G06F 17/30227* (2013.01); *G06F 17/30244* (2013.01); *G06Q 10/06* (2013.01); *G06Q 10/10* (2013.01); *G06Q 50/00* (2013.01); *G06Q 50/18* (2013.01)

(58) Field of Classification Search
CPC .......... G06F 17/30707; G06F 17/2705; G06F 17/2775; G06F 17/30011; G06F 17/30194; G06F 17/30227; G06F 17/30244; G06N 5/025; G09B 7/00
See application file for complete search history.

(56) References Cited

U.S. PATENT DOCUMENTS

| | | | | |
|---|---|---|---|---|
| 6,430,581 | B1* | 8/2002 | Mahoney et al. | ............ 715/205 |
| 6,502,081 | B1* | 12/2002 | Wiltshire, Jr. | .... G06F 17/30707 706/12 |
| 6,591,261 | B1* | 7/2003 | Arthurs | ............ G06F 17/30864 |
| 6,694,331 | B2* | 2/2004 | Lee | ................... G06F 17/30011 707/706 |
| 6,772,149 | B1* | 8/2004 | Morelock | ......... G06F 17/30675 |
| 7,028,259 | B1* | 4/2006 | Jacobson | ..................... 715/236 |
| 7,065,514 | B2* | 6/2006 | Yang-Stephens | . G06F 17/30705 |
| 8,788,523 | B2* | 7/2014 | Martin | ............... G06F 17/2775 707/755 |
| 2002/0007358 | A1* | 1/2002 | Johnson et al. | ................... 707/4 |
| 2002/0138529 | A1* | 9/2002 | Yang-Stephens | . G06F 17/30705 715/256 |
| 2003/0023539 | A1* | 1/2003 | Wilce et al. | .................... 705/37 |
| 2003/0074345 | A1* | 4/2003 | Baldwin | .............. G06F 17/218 |
| 2003/0099374 | A1* | 5/2003 | Choi | ...................... G06F 21/64 382/100 |
| 2003/0135826 | A1* | 7/2003 | Dozier | .............. G06F 17/30014 715/206 |
| 2004/0205737 | A1* | 10/2004 | Margaliot et al. | ............ 717/143 |
| 2005/0022106 | A1* | 1/2005 | Kawai | ............... G06F 17/30705 715/233 |
| 2005/0203924 | A1* | 9/2005 | Rosenberg | ........ G06F 17/30696 |
| 2005/0210048 | A1* | 9/2005 | Beres | ............... G06F 17/30569 |
| 2007/0038625 | A1* | 2/2007 | Yang-Stephens | . G06F 17/30705 |
| 2007/0088751 | A1* | 4/2007 | DeFelice | ........... G06F 17/30011 |
| 2008/0062472 | A1* | 3/2008 | Garg | ................... G06K 9/00442 358/402 |

\* cited by examiner

SYSTEMS, METHODS, AND SOFTWARE FOR QUESTIONBASED SENTIMENT ANALYSIS AND SUMMARIZATION

RELATED APPLICATION

This application is a continuation of U.S. application Ser. No. 12/354,617, filed Jan. 15, 2009, and U.S. application Ser. No. 12/553,752, filed Sep. 3, 2009, which issued as U.S. Pat. No. 8,788,523 on Jul. 22, 2014, both of which claim priority to U.S. Provisional Patent Application 61/011,147, which was filed on Jan. 15, 2008, all of which are incorporated herein by reference.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright © 2007, Thomson Reuters Global Resources.

TECHNICAL FIELD

Various embodiments of the present invention concern systems, methods, and software for detecting and/or correlating phrases in documents, such as legal contracts.

BACKGROUND

A common legal task for lawyers and other legal professionals entails drafting, analyzing, and/or negotiating transactional documents, such as legal contracts. Unlike caselaw documents, which include citations to other legal cases, that can inform lawyers about the validity, reliability, and origins of the legal text and reasoning within a given judicial opinion, contracts typically lack such indicators. Nevertheless, lawyers and other legal professionals often seek information about the precedential value and the reliability of contract (deal) documents, particularly clauses, definitions, and key phrases within these documents.

Accordingly, the present inventors identified a need for better tools to help lawyers and other legal professionals work with and analyze phrases and clauses within transactional documents.

SUMMARY

To address this and/or other needs, the present inventors devised, among other things, systems, methods, and software that support authoring and/or review of documents, such as legal contracts. One exemplary system includes a phrase discovery engine or module, which automatically processes one or more documents, such as legal contracts, and identifies and groups phrases and clauses (super phrases or uberphrases) within the documents. The phrase discovery engine can be used to assist in referencing industry standard clauses or phrases, to obtain alternative clause and/or phrase languages, or to obtain negotiation leverage.

DETAILED DESCRIPTION OF EXEMPLARY EMBODIMENT(S)

This description, which incorporates the Figures and the appended claims, describes one or more specific embodiments of an invention. These embodiments, offered not to limit but only to exemplify and teach the invention, are shown and described in sufficient detail to enable those skilled in the art to implement or practice the invention. Thus, where appropriate to avoid obscuring the invention, the description may omit certain information known to those of skill in the art.

Legal Risk and Usage Scenarios

Various embodiments of the present invention are useful in helping lawyers and other legal professionals address risk relating to drafting and/or entering into legal contracts.

There are several types of risk regarding legal contracts. One type of risk is the risk of illegality or unenforceability which relates to violating legal principles. An agreement creates a private law between the parties; however, this private law is subservient to the laws (both statutory and common law) of the jurisdiction that govern the agreement, often dictated by where the agreement is executed. Such examples include statutory requirements. (e.g. trust principle that distribution of principal may be permitted only for "health, support, education and maintenance") and common law principles. (e.g. non-compete clauses).

Another risk, known as procedural risk, concerns failure to comply with external (regulatory) or internal (contractual) requirements. An additional risk is failing to secure the best terms (negotiation risk). An agreement is a bargain between parties in which each party seeks to secure the best terms for themselves, which can be measured by other similar documents executed between parties having similar bargaining power. Business norms vary by bargaining power and change over time. Related to the previous risk is the risk of deviating from business norms and market standards (uncertainty risk). An agreement between parties is a quantifiable expression of risk that each party is willing to bear; uncertainty or unpredictability increases the risk. In order to correctly assess the level of risk, the parties must understand the value of the assets affected and their future state (asset-specific risk).

To help legal professionals manage and understand such contractual risk, the present invention is designed to function within a variety of usage scenarios.

One scenario allows the user to select a group of merger agreements, statutes, etc. to compare against each other or against a specific merger agreement, statute, etc. Another scenario entails a user selecting a paragraph from a merger agreements, statutes, etc. to compare against a group of merger agreements, statutes, etc. Yet another scenario entails a user drafting a merger agreement, and automatically receiving phrase or clause suggestions during the drafting process, with the phrase or clause suggestions automatically determined in the background based on a group of merger agreements, statutes, etc. Note: A group could be a user-defined set, a set defined by and/or for a particular law firm or corporation, or a set defined by the provider of the phrase processing engine or other third-party.

Exemplary System Platforms Incorporating Phrase Discovery Engine

Figure 1:
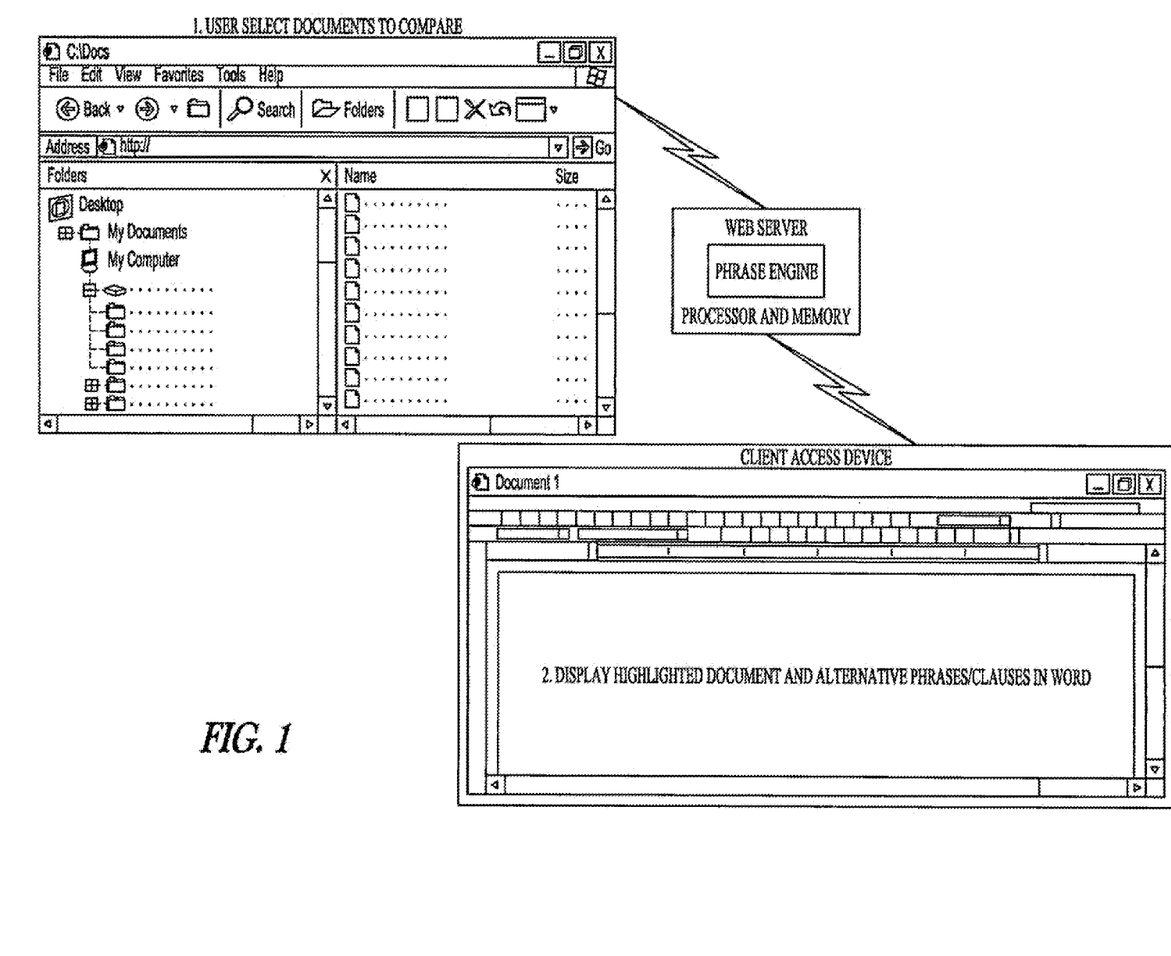
FIG. 1 is a diagram of an exemplary desktop platform corresponding to one or more embodiments of the present invention.
Figure 2:
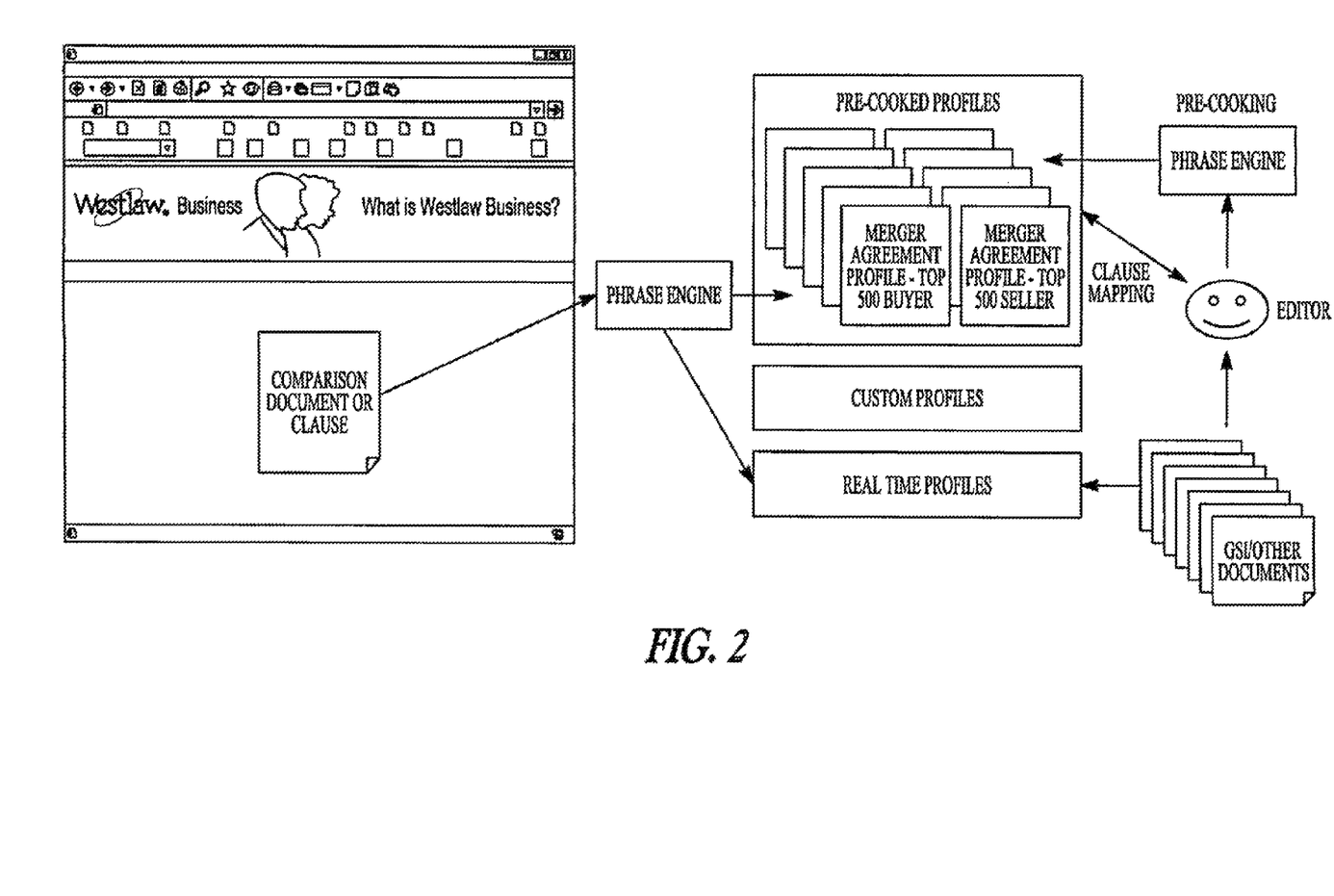
FIG. 2 is a diagram of an exemplary web service platform corresponding to one or more embodiments of the present invention.

The present invention can be implemented on a number of exemplary platforms. FIG. 1 shows that one such platform takes the form of web data service such as Westlaw.com (FIG. 1), desktop and/or firm side software (FIG. 2), multiple monitor UI, and/or a combination.

One embodiment includes a transactional negotiation leverage and research tool which benchmarks deal documents against market standards or other reference sets, which distinguishes market standard language from deal-specific or negotiated language, which links to judicial interpretation of contractual language, and/or validates codified (statutory and regulatory) language. Another embodiment involves a transactional drafting and review tool which finds alternative clauses and phrases and provides a taxonomic framework for editorial links and procedural guidance. Yet another embodiment of the present invention exemplifies prototypical documents which could include master (non-negotiated) documents for a first draft and reference documents (e.g. buyer weighted sales agreement). Other embodiments include alert functions to identify and report documents that have been affected by a change in the law, providing automated document and clause type classification with clause, definition and deal term libraries, and document vetting to identify valuable, reusable deal documents through processing-efficient phrase matching.

Exemplary Phrase Discovery Method and Software Architecture

Figures 3, 4:
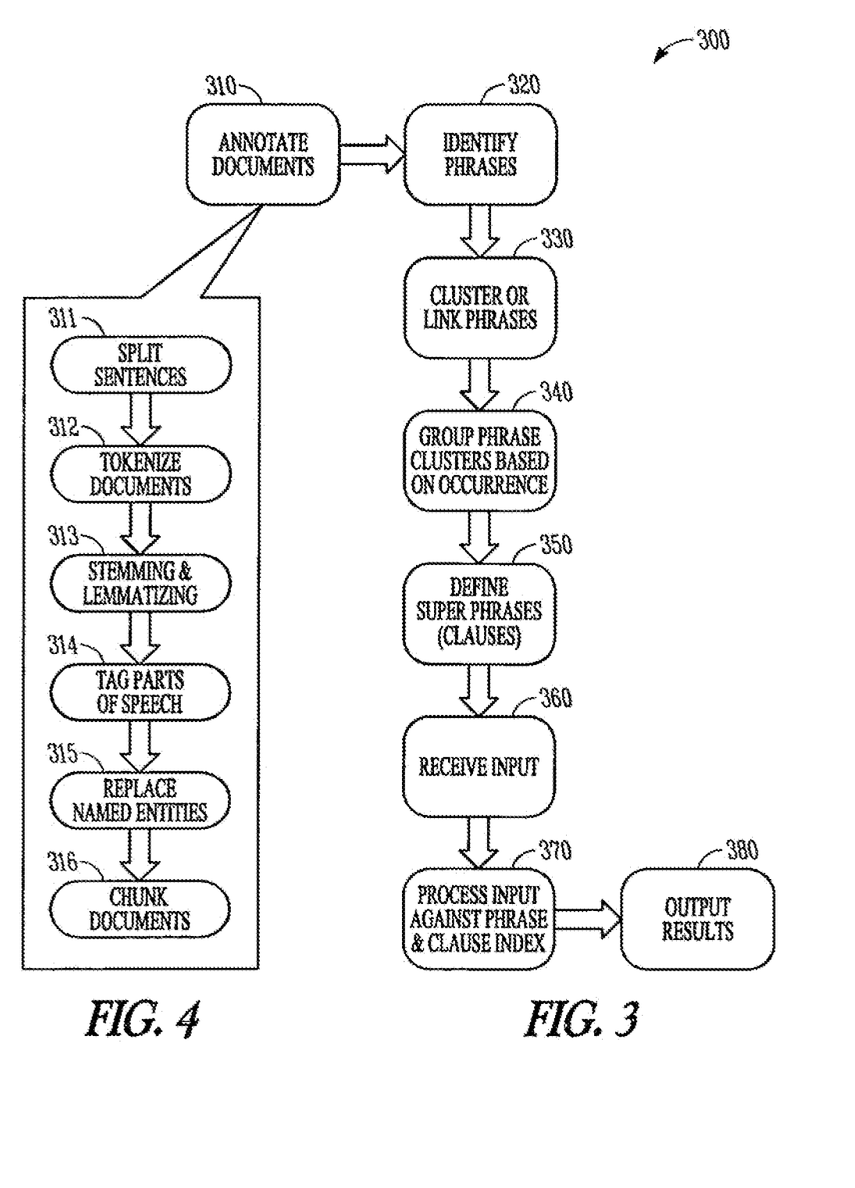
FIG. 3 is a flow chart of an exemplary method corresponding to one or more embodiments of the present invention.
FIG. 4 is a flow chart of an exemplary method corresponding to one or more embodiments of the present invention.

FIG. 3 shows a flow chart 300 of an exemplary phrase discovery and processing method. Flow chart 300 includes process blocks 310-380, which in addition to being representative of exemplary processing activity are also representative of an exemplary functional partitioning or architecture. The flow chart is therefore applicable to software, firmware, and hardware implementations.

At block 310, the exemplary method begins with annotating one or more documents, such a set of documents from a legal corpus. FIG. 4 shows an exemplary annotation method 310 via process blocks 311-316.

Block 311 entails sentence splitting. Block 312 entails tokenizing the document. Block 313 entails stemming and lemmatization of the document(s). Block 314 entails tagging parts of speech within the documents. Block 315, a named entity extractor, replaces named entities (numbers, dates, orgs, etc.) with a placeholder. This could also be done for pronouns with option of some co-reference analysis.

Block 316 performs a chunking function, which entails identifying various non-recursive phrases within the document, such as noun phrases, verb phrases, adjective phrases, adverb phrases, etc. Chunker may not work well with the placeholders but could use a dummy name to get around this aspect. In the exemplary embodiment, this parser is shallow in that it typically segments the text in a manner that uses only a single level of depth, meaning that there is no recursive nature to the resulting parsed elements. Benefits include matching or relating things that are grammatically related in addition to words that are related, eliminating a lot of statistically determined phrases because they aren't meaningful in the language of choice (speeds up the process by not having to include many of the candidates). For example, the phrase "sound mind and body" would have a bracket indicating a phrase instead of going through all different word combination scenarios to identify the phrase. This would also reduce dramatically or potentially even replace phrase identification. Chunking adds annotations on the document the same way a tokenizer does. Phrase identification could look for sequences of tokens ignoring chunks, sequences of chunks ignoring tokens, or sequence of tokens respecting certain aspects of chunk boundaries to improve several performance measures (precision, accuracy, speed, memory). Some of the document annotators might be useful only in the English language and maybe a few others. However, using only a tokenizer can be theoretically applied to any language. The outputs of all these formatting techniques are annotated/tagged documents. After the documents are annotated or tagged, exemplary execution continues at block 320 of FIG. 3.

Block 320 entails identifying co-occurring phrases within the set of documents. In the exemplary embodiment, a phrase is defined as a sequence of two or more semi-contiguous tokens that are found in two or more documents (identical matching). Semi-contiguous takes into account that several stop words may occur between the tokens of a phrase within the document. Once these stop words are removed, the tokens in an identified phrase would become continuous. Some embodiments provide an upper limit of the number of tokens in a row (example, 5 tokens in a row) or a statistical cut-off in defining or identifying phrases. One exemplary embodiment is based on an n-gram model to identify phrases. Furthermore, an additional exemplary embodiment of the present invention could use a variation of n-grams without a maximum (e.g. 5 tokens in a row maximum) and use a confidence-based threshold (n-grams with pruning the search). The pruned n-grams approach would cease identifying a phrase when there is no longer enough support for the token sequence. For example if beer and diaper are not a phrase, this approach can determine that beer, diaper, president are not going to be a phrase either.

Another exemplary embodiment utilizes a sequence alignment technique to identify phrases occurring in two or more documents. Sequence alignment looks at all tokens sequences between two documents simultaneously and decides where the phrases reside. Examples of sequence alignment algorithms include Needleman-Wunsch algorithm, BLAST, or a multiple alignment technique that can be used for more than two documents simultaneously. Once the phrases are identified, they are also associated with a number indicating the number of documents they occur in, the type of document they occur, for example, will, trust, contract, contract type, end-user license agreement, etc. execution continues at block 330.

Block 330 entails linking or clustering the identified phrases into equivalence classes or families. In the exemplary embodiment, phrase linkage occurs when two or more phrases are similar enough to represent the same phrase. Several techniques can be utilized for linking including simple, complete and average linkage. Additionally, an exemplary embodiment uses external corpus/resources such as Wikipedia, Westlaw® Headnotes with KeyNumbers, Black's Law dictionary (corpus of conceptual entities) to determine the linkage between two or more phrases.

More particularly, the exemplary embodiment uses an algorithm that looks at the words in the phrase and associates the phrase with a concept. It then associates the phrase with a surrogate identifier, trying to match that with other surrogate identifiers that it has found in Wikipedia, for example. If two of the phrases that have not otherwise been linked are found to have a common concept according to the external resource, then an assumption is made that the two phrases are sufficiently similar to be linked or clusters into the same equivalence class. When phrase linkage is complete, execution proceeds to block 340.

Block 340 entails grouping or clustering the phrase clusters or equivalence classes based on phrase co-occurrence into larger phrase groupings. The exemplary embodiment deems phrase co-occurrence to occur when sets of equivalent classes show up together frequently enough, that is within a threshold number of documents together. Exemplary thresholds include support thresholds, confidence thresholds, strength, and interestingness even when you don't know what you are searching for. An additional exemplary embodiment includes the method of frequent item-set mining (FIM). It is important to note that proximity between phrases does not matter nor does order for this step. However, phrase proximity plays a role in defining and utilizing super-phrases.

Block 350 entails defining a set of clauses (super phrases or uber phrases) based on phrase proximity and uniqueness. In the exemplary embodiment, a super-phrase (uberphrase) is a collection of text areas that are associated with a phrase set. More particularly, a superphrase is a region of text bounded by two phrases in close proximity.

One exemplary embodiment uses association rules mining (ARM) to find associations within a set of equivalence classes. The result is inference rules—rules to arrive at inferences from a set of clauses, and make statements about those clauses. For example, the inference rules say 90% of the contracts clauses also had these clauses as well. This embodiment also provides recommendation rules based on inference rules to be used in risk-avoidance recommendations and drafting recommendations given the proximity and uniqueness constraints. These recommendation rules could provide for benchmarking or best practices standards to compare to user's work product or even a checklist for certain documents. If high thresholds of certain sets are met, a comparison of those sets to what user has drafted in order to provide recommendations. Other exemplary embodiments for determining and generating super-phrases/uberphrases include tf-idf, indexing, clustering.

The parameters for system could be user defined or a machine learning technique could be used to automatically determine the optimal parameters. Another feature allows for suffix arrays as a data structure choice when given large sequences of text to quickly access substrings. The suffix array of a string can be used as an index to quickly locate every occurrence of a substring within the string. Finding every occurrence of the substring is equivalent to finding every suffix that begins with the substring. Thanks to the lexicographical ordering, these suffixes are grouped together in the suffix array, and can be found efficiently with a binary search.

When block 350 finishes, an index of phrases, phrase clusters, groups of phrase clusters, and superphrases (or clauses) is available for use. In this index or data structure, each of the phrases, groups, and superphrases is associated not only with a document identifier and document positional information for the associated text, but also metadata regarding the origin, authors, law firms, dates, jurisdictions, type of document (will, real estate agreement, mergers and acquisition agreement, confidentiality agreement, license agreement, etc.) (Some embodiments tag one or more of the phrases or clauses from the document corpus as good or bad (valid or invalid). This tagging may be done automatically based on a classifier (for example, an support vector machine) trained with known good or bad phrases or clauses, or manually by legal experts.)

Block 360 entails receiving user text input. In the exemplary embodiment, the input text is presented from an active edit window of a word processing application such as the Word or WordPerfect application. However, in some embodiments, the input is a set of documents, such as agreements, from a law firm. In other embodiments, the input takes the form of a single agreement or clause or paragraph of an agreement. In some embodiments, the input may be provided by a browser application. For example, a user may encounter an end-user license agreement (EULA) and an application program interface may automatically or with specific user direction identify the EULA as input. Exemplary execution continues at block 370.

Block 370 entails processing the input text against the index structure created using process blocks 310-350. In the exemplary embodiment, this entails essentially processing the input text using blocks 310-350 to identify phrases, phrase groups, and superphrases and then identifying a ranked list of most similar phrases, phrase groups, and superphrases from the index structure. At this point, corresponding documents, phrases, and associated meta data for the most similar phrases (based on one or more computed similarity metrics) will be available.

Block 380 entails outputting results of the processing in block 370. In the exemplary embodiment, the results can take a variety for forms, such as listing of similar clauses or phrases and associated metadata; a listing of links for a set of documents having phrases or clauses most similar to the put one; and/or an annotated version of the input text indicating portions in conformity with known standard phrases as well as clauses that have deviated from such norms. In some embodiments, the norms may be a specific set of documents or clauses that have for example preapproved for use by law department for a given corporation or by a given law firm.

Figure 5:
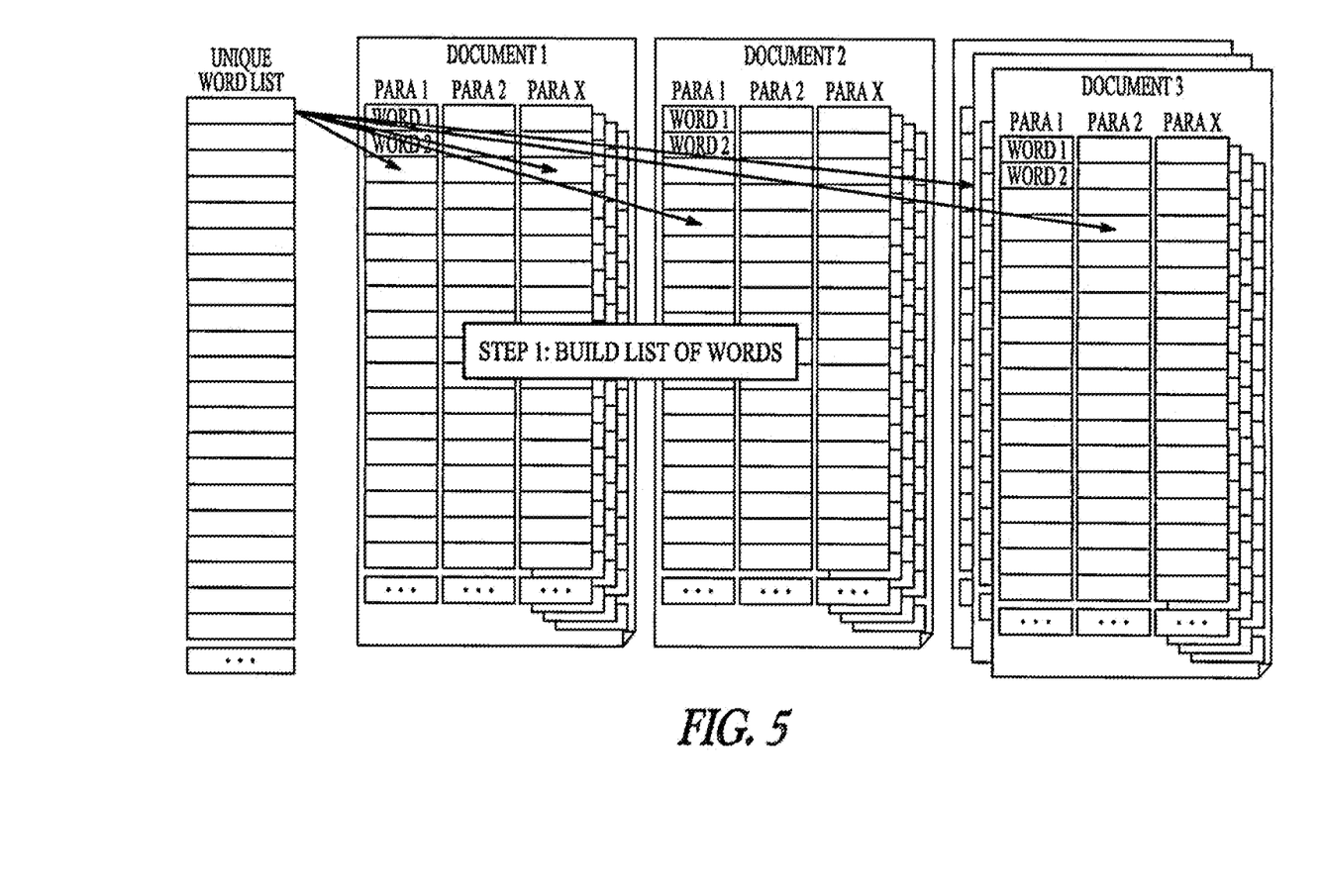
FIG. 5 is a conceptual illustration of an action within a phrase discovery engine corresponding to one or more embodiments of the present invention.

FIGS. 5-9 show a more conceptual version of an exemplary phrase discovery methodology. FIG. 5 illustrates building a unique word list from any corpus of documents. In creating this word list, any standard search indexing techniques such as stemming, synonyms, etc. may be used.

Figure 6:
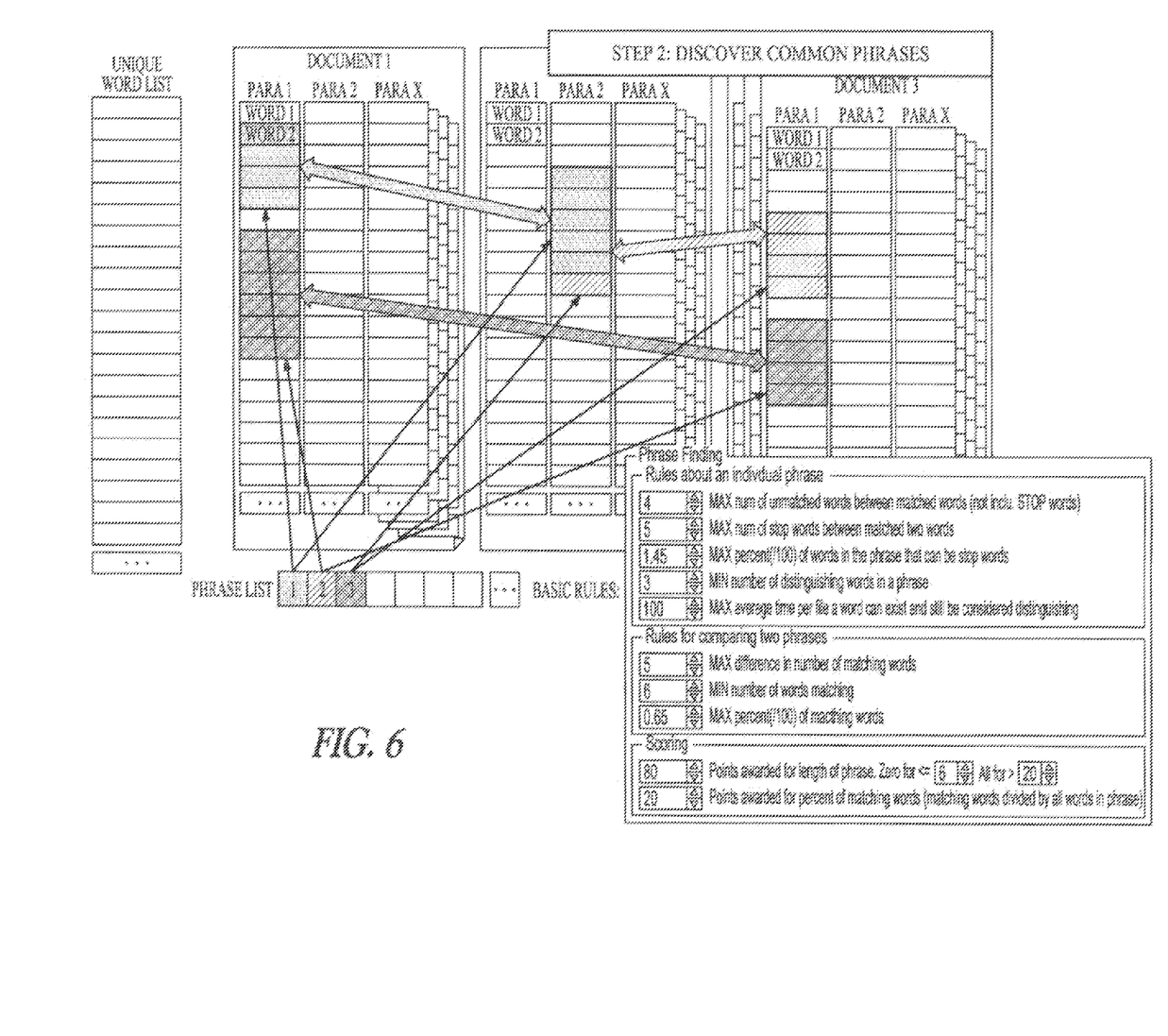
FIG. 6 is a conceptual illustration of another action within a phrase discovery engine corresponding to one or more embodiments of the present invention.

FIG. 6 represents an act of detecting common phrases. Phrase detection uses common word sequences appearing in two or more documents with defined proximity to generate candidate phrase lists. Phrase detection rules combine parsers for filtering, comparing and scoring candidate phrases. The rules may be adjusted for different document domains and include minimum number and/or percentage of matching words and maximum number or percentage of unmatched or stop words. In addition, some embodiments take into consideration word alternatives in phrases. Within a phrase some words or shorter phrases may appear and are identified as common word alternatives. Given the basic rules that the user has inputted, common phrases are discovered. Once these common phrases are recognized, a phrase list is created and the common phrases are saved within the list. Then phrase matching compares phrase lists across multiple documents to identify common phrases.

Figure 7:
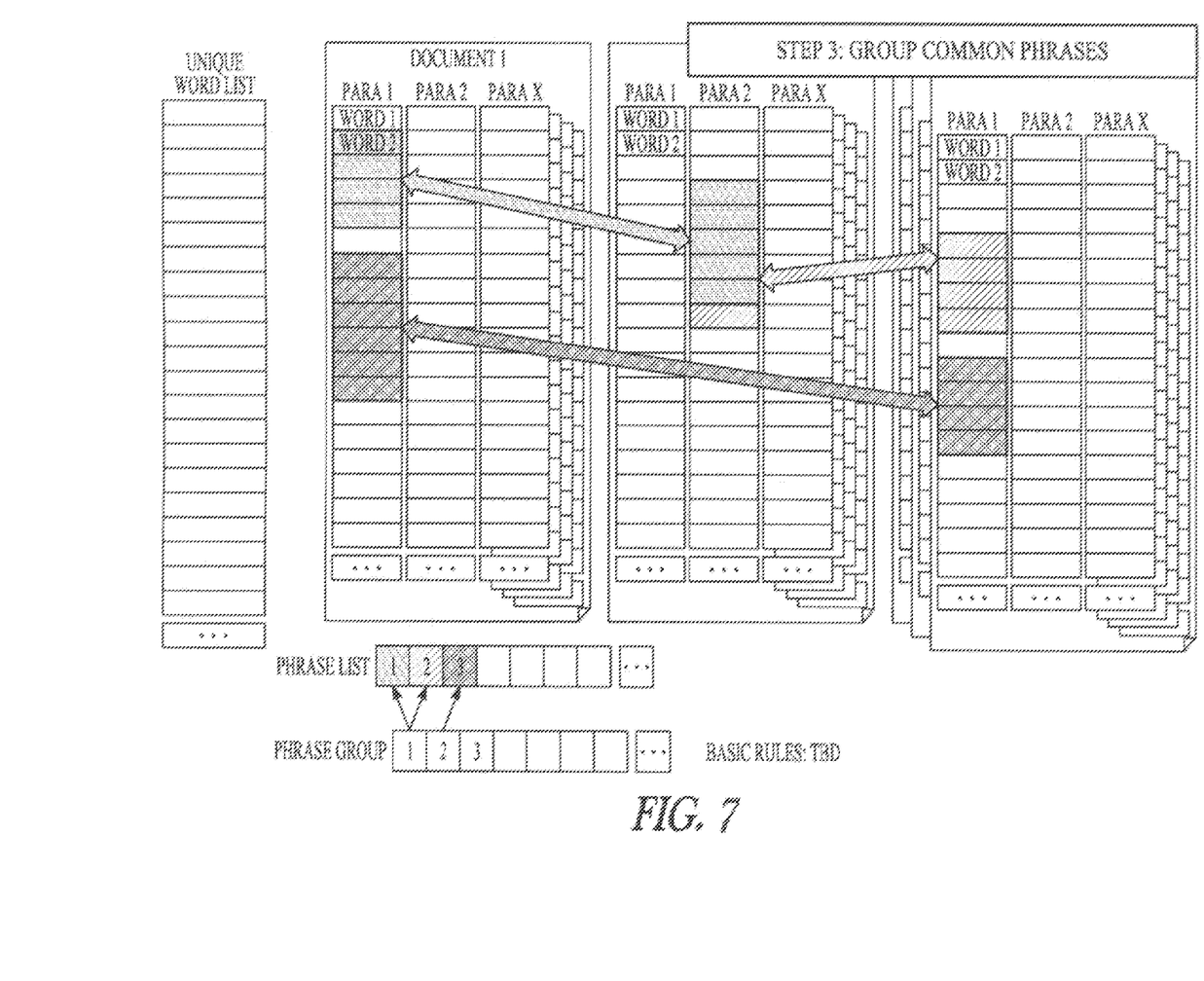
FIG. 7 is a conceptual illustration of another action within a phrase discovery engine corresponding to one or more embodiments of the present invention.
Figure 8:
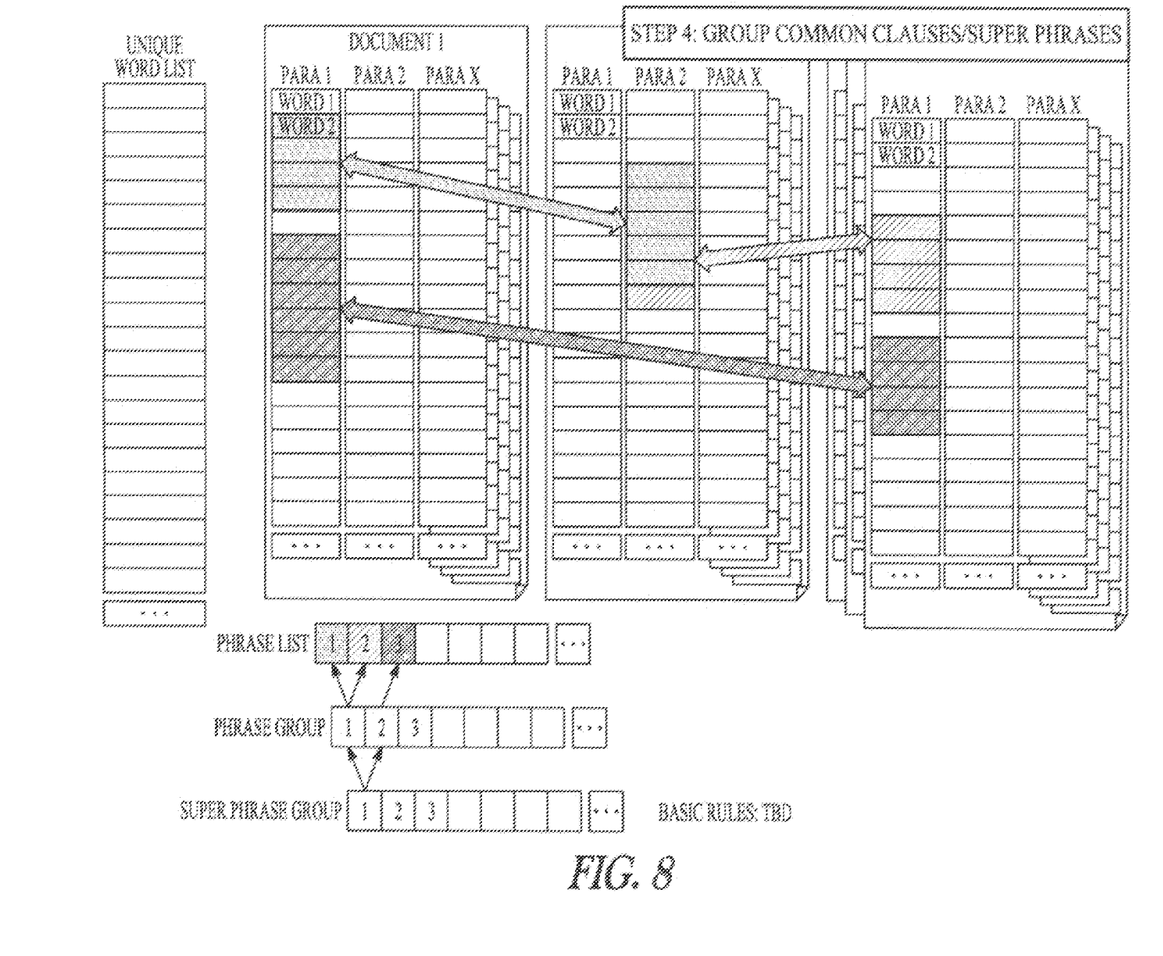
FIG. 8 is a conceptual illustration of another action within a phrase discovery engine corresponding to one or more embodiments of the present invention.

FIG. 7 shows an act of grouping or clustering common phrases. Since phrases may be overlapping, phrase group rules identify individual and phrase groups. Some embodiments allow for non-overlapping clusters, whereas others allow for overlapping clusters.

Once the common phrases are found and grouped, the fourth step (FIG. 8) includes grouping common clauses or super phrases. Rules are applied to further improve precision and recall and to group into clauses. For example, in 10,000 documents two phrases were always near each other, but in the 100 documents where only one of the phrases appeared, it had a low score and manual review showed they were not good matches. Therefore, those phrases are not considered to be like phrases.

Figure 9:
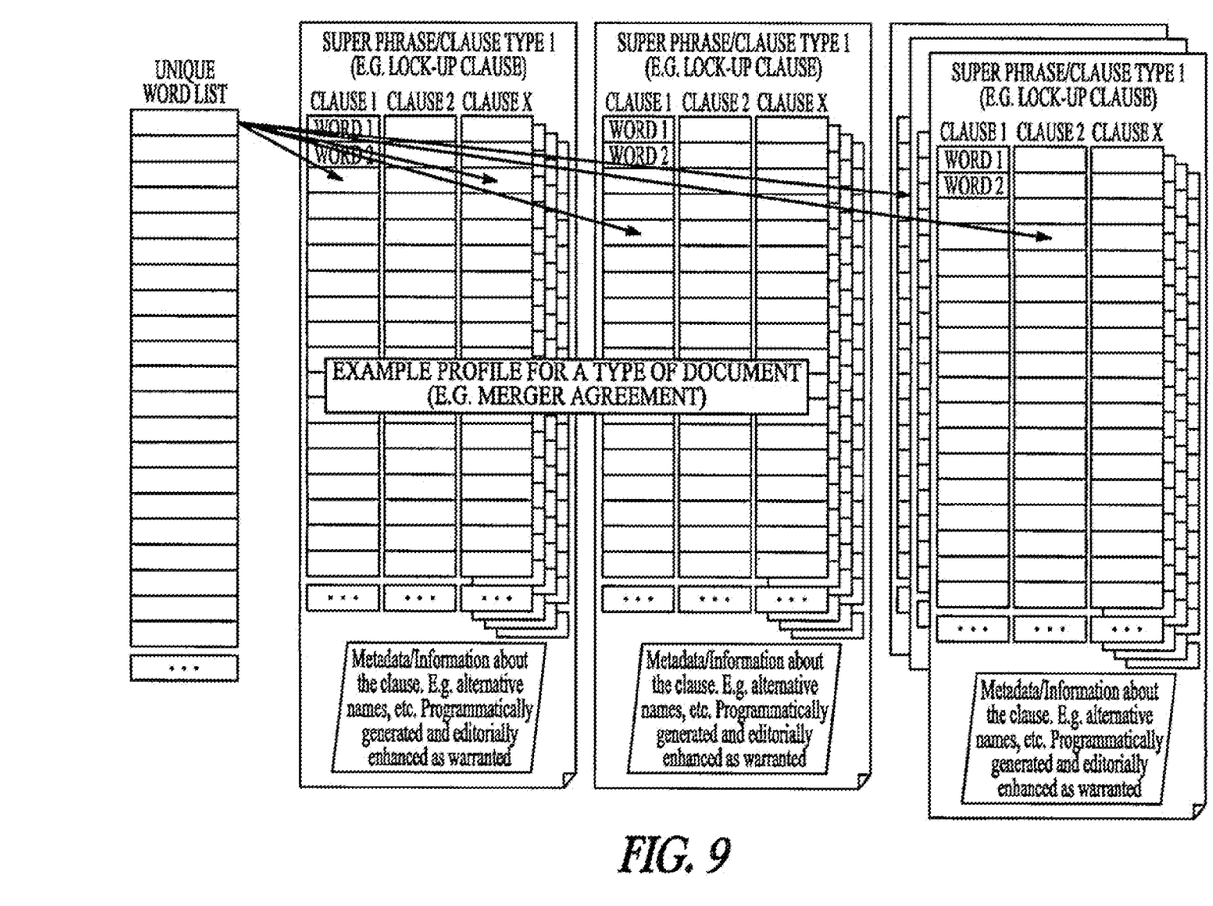
FIG. 9 is an illustration of a document profile corresponding to one or more embodiments of the present invention.

FIG. 9 shows that after grouping, the exemplary method identifies the names of clauses. At this point, a solid collection of clauses in, for example—merger agreements—can be used as an index file or profile for future merger agreement comparison. This set of profiles simply improves performance and reduces processing time; however the option to choose a set and compare documents is still available.

Now a profile of the document set has been created. The profiles are saved and in future processing, the user can utilize just this profile as a "document", and/or utilize a set of preclassified profiles to train a classifier that categorizes a given document or clause. In addition, a profile can be used to "name" clauses manually for a document type, and deconstruct other documents based off of that set.

The following factors may be taken into account when defining phrase, clause or super phrase:
 # of matching words
 # of unmatched words between words
 Order of matching words
 Distinguishing words
 Length of phrase
  And comparative length to matches
 # of documents containing phrase
  E.g. 10,000 merger agreements processed, only 2 files contain a certain phrase, it is likely not a phrase.
 Proximity of phrases
 Frequency of phrase groups in super phrase
 Scoring defaults can be set for document types and are always manually and programmatically adjustable. Some sample scoring metrics are listed:
 Length of phrase
 # of words matched
 # of distinguishing words
 Order of words
 # of documents matched
 # of words across documents
 Proximity to other typically associated phrases (e.g. a sample set of 10,000 merger agreements, 9,000 have phrases A & B within 2 paragraphs of each other. While processing a new merger agreement, we discover phrases similar to A&B within 2 paragraphs of each other, so these are almost certainly variations of A&B).

Order of words can also be tabulated in a similarly

Percent of total text in paragraph that matches phrases. Those of skill will appreciate that the exemplary embodiment in a sense provides three types of parsers: Phrase Detection (Identification and matching based on word commonality, proximity and uniqueness); Phrase Grouping (phrase groups based on phrase commonality); and Uberphrases (phrase sets based on phrase group commonality and potentially proximity)

Once blocks 160 have been executed for a corpus of documents, for example, from a law firm or from across multiple law firms, such in a collection of agreement for an online legal research service, one can repeat the methodology for a given document and identify related phrases and clauses and documents from the phrases using similarity metrics. Also, one may simply run a query against the phrase families, phrase family groupings, and/or phrase groupings to identity similar phrases as well as their corresponding documents and associated meta data, such as jurisdiction, location of author, date of addition to the corpus, etc. Indeed, if the corpus is assembled based on user submission, user data such as attorney name, state, jurisdiction, licensure, experience, and so forth can become part of the metadata associated with each document and thus each phrase or clause it contains, enabling one to discern likely origin or pedigree of phrases or clauses as well as popularity or rarity and other metrics.

Exemplary Interface for Controlling Phrase Discovery

Given the variety of use scenarios, various embodiments of systems incorporating the present invention provide a graphical user interface for defining or controlling user preferences regarding operation of a phrase processing engine.

Figure 10:
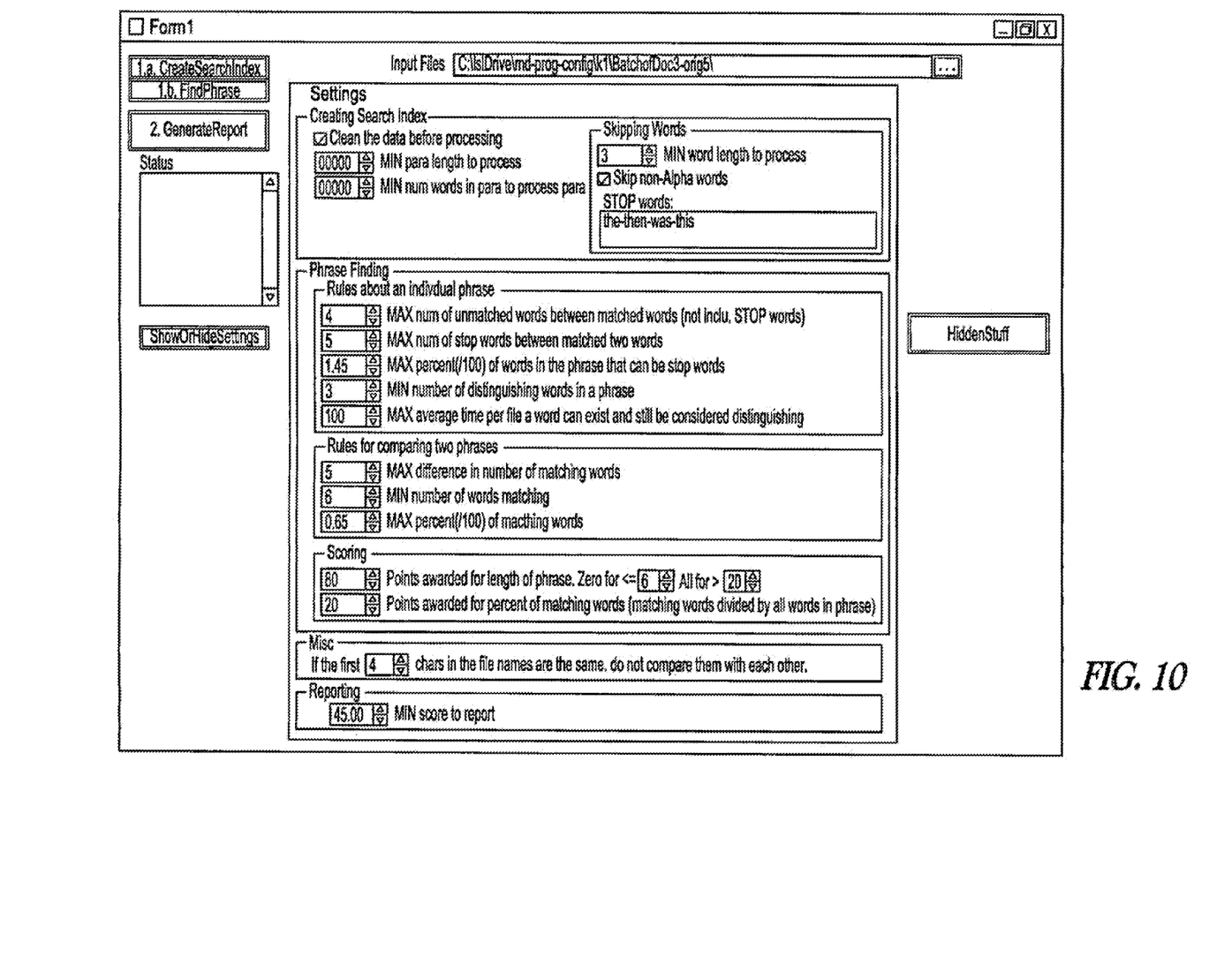
FIG. 10 is a facsimile of a graphical user interface portion of an exemplary multi-functional document draft and analysis system corresponding to one or more embodiments of the present invention.

FIG. 10 shows an exemplary user preference interface for controlling phrase functions in some embodiments of the present invention. Some of these results include highlighting of negotiated/deal specific text versus boilerplate versus other (e.g. statutory), indicating degrees of variance, providing summary of risks for document overall and specific clauses, suggesting alternative clauses/additional clauses based on degrees of similarity or dissimilarity, and suggesting relevant caselaw/statutes and other materials. In addition, these results provide dynamic document analysis and form creation.

CONCLUSION

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the following claims and their equivalents.

What is claimed is:
1. A method comprising:
 processing a physical document by capturing an image representation of the physical document and generating a set of image data associated with the physical document;

transforming the set of image data into a set of electronic text representing text appearing on the physical document;

receiving the set of electronic text;

parsing by a phrase discovery engine the electronic text into a set of tokens and identifying and extracting a set of legal clauses, wherein each legal clause in the set of legal clauses comprises two or more semi-contiguous tokens;

comparing the set of legal clauses to legal clauses previously derived from a corpus of other electronic documents, wherein comparing the set of legal clauses to previously derived legal clauses from a corpus of other electronic documents comprises providing an index of clauses, wherein each clause in the index of clauses is associated with a legal classification from a set of legal classifications;

identifying one or more legal clauses from the set of legal clauses based on the comparison; and assigning a legal classification to one or more of the identified legal clauses in the identified set of legal clauses based on the set of legal classifications.

2. The method of claim 1, wherein receiving the electronic document comprises:

identifying a portion of text from a document within an active edit window of a word processing application;

transmitting the portion of text over a network; and receiving the identified portion at a server configured to parse the electronic text into the set of legal clauses.

3. The method of claim 1, wherein comparing the set of legal clauses to previously derived legal clauses from a corpus of other electronic documents comprises providing an index of clauses, with each clause associated with jurisdiction information.

4. The method of claim 3, wherein each clause is associated with a document class identifier.

5. The method of claim 4, wherein the document class identifier indicates at least one of a set of legal agreement types.

6. The method of claim 1, wherein comparing the set of legal clauses to previously derived legal clauses from a corpus of other electronic documents comprises:

computing a first similarity metric based on a first clause from the set of legal clauses and a first one of the previously derived legal clauses from the corpus of other electronic documents; and computing a second similarity metric based on the first clause and a second one of the previously derived legal clauses from the corpus of other electronic documents.

7. The method of claim 6, further comprising ranking the first one of the previously derived legal clauses relative to the second one of the previously derived legal clauses based on the first and second similarity metrics.

8. The method of claim 7, wherein identifying one or more of the set of legal clauses based on the comparison comprises outputting a ranked listing of the first and second ones of the previously derived legal clauses.

9. The method of claim 1, further comprising flagging one or more from the set of legal clauses of the received electronic text as deviating from or conforming with one or more clauses extracted from the corpus of other documents.

10. The method of claim 1, further comprising identifying and extracting a set of entity names from the electronic text and replacing the set of entity names at least one placeholder.

11. The method of claim 1, wherein the parsing further comprises performing a chunking function on the electronic text to identify the set of legal clauses.

12. The method of claim 11, wherein performing the chunking function includes identifying the set of legal clauses using a method selected from the group consisting of: identifying sequences of tokens ignoring chunks; identifying sequences of chunks ignoring tokens; and identifying sequences of tokens respecting chunk boundaries.

13. A system comprising:

means for processing a physical document by capturing an image representation of the physical document and generating a set of image data associated with the physical document;

means for transforming the set of image data into a set of electronic text representing text appearing on the physical document;

means for receiving the set of electronic text;

a phrase discovery engine adapted to parse the electronic text into a set of tokens and identify and extract a set of legal clauses, wherein each legal clause in the set of legal clauses comprises two or more semi-contiguous tokens;

means for comparing the set of legal clauses to legal clauses previously derived from a corpus of other electronic documents, wherein comparing the set of legal clauses to previously derived legal clauses from a corpus of other electronic documents comprises providing an index of clauses, wherein each clause in the index of clauses is associated with a legal classification from a set of legal classifications;

means for identifying one or more legal clauses from the set of legal clauses based on the comparison; and means for assigning a legal classification to one or more of the identified legal clauses in the identified set of legal clauses based on the set of legal classifications.

14. The system of claim 13, wherein the means for receiving the electronic document comprises:

means for identifying a portion of text from a document within an active edit window of a word processing application;

means for transmitting the portion of text over a network; and means for receiving the identified portion at a server configured to parse the electronic text into the set of legal clauses.

15. The system of claim 14, wherein the means for comparing the set of legal clauses to legal clauses previously derived from a corpus of other electronic documents comprises an index of clauses, with each clause associated with jurisdiction information.

16. The system of claim 15, wherein each clause is associated with a document class identifier.

17. The system of claim 15, wherein the document class identifier indicates at least one of a set of legal agreement types.

18. The system claim 14, wherein one or more of the recited means is implemented using one or more processors operatively coupled to one or more memory devices, wherein each of the memory devices includes one or more machine executable instructions sets for causing the processor to perform the recited function.

19. The system of claim 18, wherein one or more of the processor resides on a web server operatively coupled to a legal research database and one or more of the processors resides on a client access device communicatively coupled to the server via a wide or local area network.

* * * * *